US009534066B2

(12) United States Patent
Boesten et al.

(10) Patent No.: US 9,534,066 B2
(45) Date of Patent: Jan. 3, 2017

(54) CREEP-OPTIMIZED UHMWPE FIBER (75) Inventors: Jorn Boesten, Echt (NL); Martin Pieter Vlasblom, Echt (NL); Piotr Matloka, Echt (NL); Timothy James Kidd, Echt (NL); Romain Berthoud, Echt (NL); Johannes Hendrikus Marie Heijnen, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 289 days.

(21) Appl. No.: 14/111,084

(22) PCT Filed: Apr. 3, 2012

(86) PCT No.: PCT/EP2012/056079
§ 371 (c)(1),
(2), (4) Date: Dec. 30, 2013

(87) PCT Pub. No.: WO2012/139934
PCT Pub. Date: Oct. 18, 2012

(65) Prior Publication Data
US 2014/0106104 A1    Apr. 17, 2014

(30) Foreign Application Priority Data

Apr. 13, 2011 (EP) .................................. 11162246

(51) Int. Cl.
*C08F 110/02* (2006.01)
*F41H 7/02* (2006.01)
(Continued)

(52) U.S. Cl.
CPC ............... *C08F 110/02* (2013.01); *D01F 6/04* (2013.01); *F41H 1/02* (2013.01); *F41H 1/08* (2013.01);
(Continued)

(58) Field of Classification Search
CPC ............. C08F 110/02; F41H 1/08; F41H 7/02; F41H 5/04; F41H 1/02; D01F 6/04; Y10T 428/249921; Y10T 442/10; Y10T 442/60; Y10T 442/30; Y10T 428/1352; Y10T 428/139
(Continued)

(56) References Cited

U.S. PATENT DOCUMENTS

2010/0249831 A1* 9/2010 Vlasblom et al. ............ 606/228
2010/0286728 A1* 11/2010 Simmelink .............. D01D 5/04
606/228

FOREIGN PATENT DOCUMENTS

EP    1 842 862    10/2007
JP    6-280111     10/1994
(Continued)

OTHER PUBLICATIONS

Berzen, et al., "Ultrahigh molecular weight polyethylene (UHMWPE): application in artificial joints," The British Polymer Journal, (10) 1978, p. 281-287.*
(Continued)

Primary Examiner — Gwendolyn Blackwell
Assistant Examiner — Kevin Ortman, Jr.
(74) Attorney, Agent, or Firm — Nixon & Vanderhye P.C.

(57) ABSTRACT

The invention relates to a creep-optimized ultrahigh molecular weight polyethylene (UHMWPE) fiber obtained by spinning an UHMWPE comprising olefinic branches (OB) and having an elongational stress (ES), and a ratio (OB/1000 C/ES) between the number of olefinic branches per thousand carbon atoms (OB/1000 C) and the elongational stress (ES) of at least 0.2, wherein said UHMWPE fiber when subjected to a load of 600 MPa at a temperature of 70° C., has a creep lifetime of at least 90 hours.

13 Claims, 2 Drawing Sheets (51) Int. Cl.
*D01F 6/04* (2006.01)
*F41H 1/02* (2006.01)
*F41H 1/08* (2006.01)
*F41H 5/04* (2006.01)

(52) U.S. Cl.
CPC *F41H 5/04* (2013.01); *F41H 7/02* (2013.01); *Y10T 428/139* (2015.01); *Y10T 428/1352* (2015.01); *Y10T 428/249921* (2015.04); *Y10T 442/10* (2015.04); *Y10T 442/30* (2015.04); *Y10T 442/60* (2015.04)

(58) Field of Classification Search
USPC .......... 428/36.9, 221, 35.7; 442/181, 221, 1; 526/352; 89/36.02
See application file for complete search history.

(56) References Cited

FOREIGN PATENT DOCUMENTS

| | | |
|---|---|---|
| JP | 6 280111 | 10/1994 |
| MX | 284324 | 3/2011 |
| WO | WO 2009043597 A2 * | 4/2009 ............... D01F 6/04 |
| WO | WO 2009043598 A2 * | 4/2009 ............... D01F 6/04 |
| WO | 2009/077168 | 6/2009 |
| WO | 2011/018237 | 2/2011 |
| WO | WO 2011018237 A2 * | 2/2011 ............... C08F 10/00 |

OTHER PUBLICATIONS

Vlasblom, et al, "Predicting the Creep Lifetime of HMPE Mooring Rope Applications," Oceans 2006, IEEE, Pl, Sep. 1, 2006, pp. 1-10.
Ohta et al, "Short Branch Effects on the Creep Properties of the Ultra-High Strength Polyethylene Fibers," Journal of Polymer Science Part B: Polymer Physics, John Wiley & Sons, Inc., vol. 32, Jan. 1, 1994, pp. 261-269, Japan.
International Search Report for PCT/EP2012/056079 mailed Jun. 22, 2012.
Vlasblom et al., "Predicting the Creep Lifetime of HMPE Mooring Rope Applications", Oceans 2006, IEEE, Pl, Sep. 1, 2006, pp. 1-10.
Ohta et al., "Shirt Branch Effects on the Creep Properties of the Ultra-High Strength Polyethylene Fibers", Journal of Polymer Science Part B: Polymer Physics, John Wiley & Sons, Inc., vol. 32, Jan. 1, 1994, pp. 261-269.

* cited by examiner

CREEP-OPTIMIZED UHMWPE FIBER

This application is the U.S. national phase of International Application No. PCT/EP2012/056079 filed 3 Apr. 2012 which designated the U.S. and claims priority to EP 11162246.0 filed 13 Apr. 2011, the entire contents of each of which are hereby incorporated by reference.

This invention relates to a creep-optimized, ultra high molecular weight polyethylene (UHMWPE) fiber, a process for producing the same and various products such as ropes, nets, medical devices, fabrics, laminates, composite articles and ballistic-resistant articles containing said UHMWPE fibres.

During the last decades, many research projects focused on improving the creep properties of synthetic fibers, since such fibers are extremely suitable for a wide range of applications where lightweight and strength are driving factors. One example of synthetic fibers is UHMWPE fibers, which meet successfully the weight and strength requirements. The almost unmatched strength of UHMWPE fibers combined with ultraviolet resistance, chemical resistance, cut and abrasion resistance and other favorable properties are the reasons that these fibers found an almost immediate utilization in rope mooring, composite reinforcement, medical devices, cargo nets and the like.

UHMWPE fibers have however one drawback which acts as an impediment for their optimal utilization in long-term applications, this drawback being related to their creep behavior. It was observed that the ultimate failure mode of a system using UHMWPE fibers and in particular of those systems placed under a long-term load, is rupture or failure due to creep. Such systems and particularly those intended for long-term or ultralong-term use, must therefore be over-designed to last for a large number of years, e.g. more than 10 years and in some cases more than even 30 years. Therefore, an immediate need was felt in the industry, i.e. the need for an UHMWPE fiber having an optimized creep behavior. Accordingly many research projects aiming to improving UHMWPE fibers focused on their creep behavior and almost all these projects focused solely on optimizing a creep rate thereof.

For example it was recognized by the inventors of JP 6 280111 that manufacturing fibers from branched UHMWPE polymers may produce fibers having good creep resistance. JP 6 280111 thus discloses a branched UHMWPE and a method for manufacturing fibers therefrom. However, it was observed that the branching of the UHMWPE as described in JP 6 280111 may have deleterious effects on the ultimate fiber properties and may still not deliver a fiber with an optimized creep behaviour.

Further examples of UHMWPE fibers having a good creep behaviour and a process for producing thereof are known from EP 1,699,954; disclosing UHMWPE fibres having creep rates as low as $1 \times 10^{-6}\,\mathrm{sec}^{-1}$ as measured at 70° C. under a load of 600 MPa and tensile strengths as high as 4.1 GPa.

WO 2009/043598 and WO 2009/043597 also disclose UHMWPE fibers having a good combination of creep rate and tensile strength, e.g. a creep rate of at most $5 \times 10^{-7}\,\mathrm{sec}^{-1}$ as measured at 70° C. under a load of 600 MPa, and a tensile strength of at least 4 GPa.

U.S. Pat. No. 5,578,374 discloses a low creep rate, high modulus, low shrink, high tenacity UHMWPE fiber having good strength retention at high temperatures and methods to produce such fiber.

The present inventors observed however that apart of the UHMWPE fibers' creep rate, other creep properties need to be improved also. Under constant loading UHMWPE fibers show an irreversible deformation that is strongly dependent upon load and temperature. The rate of the irreversible deformation is called creep rate and is a measure of how fast the UHMWPE fibers are undergoing said deformation. However, the UHMWPE fibers' survivability under a long-term load, or in other words the time during which the UHMWPE fibers can be used for a specific application without the need of replacing them, needs to be improved also. Very surprisingly, it was observed that UHMWPE fibers having good creep rates may show a rather poor survivability.

It is therefore immediately recognizable that from an engineering perspective, said UHMWPE fibers' survivability is the property that needs to be primarily optimized as in turn the design and/or service life of any system or device using thereof may also be optimized. It was furthermore observed that in spite of the tremendous amount of research on creep rate optimisation, UHMWPE fibers having an optimal survivability are not presently available.

An aim of the present invention may therefore be to provide an UHMWPE fiber having an optimized survivability. A further aim of the present invention may be to provide an UHMWPE fiber having an optimized survivability and also good tensile properties, e.g. tensile strength, tensile modulus and/or elongation at break. A yet further aim of the present invention may be to provide an UHMWPE fiber having an improved survivability when compared to the survivability of the existing UHMWPE fibers.

The invention provides a creep-optimized UHMWPE fiber obtained by spinning an UHMWPE comprising olefinic branches (OB) and having an elongational stress (ES), and a ratio $$\left( \frac{OB/1000\ C}{ES} \right)$$

between the number of olefinic branches per thousand carbon atoms (OB/1000 C) and the elongational stress (ES) of at least 0.2, wherein said UHMWPE fiber when subjected to a load of 600 MPa at a temperature of 70° C., has a creep lifetime of at least 90 hours, preferably of at least 100 hours, more preferably of at least 110 hours, even more preferably of at least 120 hours, most preferably of at least 125 hours. Preferably the UHMWPE has an intrinsic viscosity (IV) of at least 5 dl/g.

It was observed that by optimizing the creep lifetime of a fiber, its survivability under a long-term load may also be optimized. In particular it was observed that inventive UHMWPE fibers may be produced in accordance with the invention, said fibers having a creep lifetime never achieved hitherto by any existing UHMWPE fiber. It was also observed that due to its optimized creep properties the inventive UHMWPE fiber is useful in a variety of applications and in particular in those applications where a long- or an ultralong-term load is applied on said fibers, e.g. offshore oil production platform mooring. By ultralong-term load is herein understood a load that is applied on the inventive UHMWPE fibers for at least 5 years, more preferably at least 10 years, more preferably for at least 20 years, preferably under normal use conditions e.g. of humidity, temperature and load. For example, for offshore mooring, normal load conditions may be loads of at most 70% of the breaking load of the fibers or of the product containing said fibers such as ropes; and normal temperature conditions may be the temperature of the environment, e.g. of water at various depths or above water. The inventors also observed that the design of systems or devices intended for long-term and ultralong-term applications and comprising the inventive UHMWPE fibers, may be less complicated and laborious.

Preferably, the olefinic branches have a number of carbon atoms between 1 and 15, more preferably between 2 and 10, most preferably between 2 and 6. Good results were obtained when the branches were ethyl branches (C=2) or butyl branches (C=4).

Therefore in one embodiment, the invention provides a creep-optimized UHMWPE fiber obtained by spinning an UHMWPE comprising ethyl branches and having an intrinsic viscosity (IV) of preferably at least 5 dl/g, an elongational stress (ES), and a ratio $$\left(\frac{C2H5/1000\ C}{ES}\right)$$

between the number of ethyl branches per thousand carbon atoms (C2H5/1000 C) and the elongational stress (ES) of at least 0.5, wherein said UHMWPE fiber when subjected to a load of 600 MPa at a temperature of 70° C., has a creep lifetime of at least 90 hours, preferably of at least 100 hours, more preferably of at least 110 hours, even more preferably of at least 120 hours, most preferably of at least 125 hours.

In another embodiment, the invention provides a creep-optimized UHMWPE fiber obtained by spinning an UHMWPE comprising butyl branches and having an intrinsic viscosity (IV) of preferably at least 5 dl/g, an elongational stress (ES), and a ratio $$\left(\frac{C4H9/1000\ C}{ES}\right)$$

between the number of butyl branches per thousand carbon atoms (C4H9/1000 C) and the elongational stress (ES) of at least 0.2, wherein said UHMWPE fiber when subjected to a load of 600 MPa at a temperature of 70° C., has a creep lifetime of at least 90 hours, preferably of at least 100 hours, more preferably of at least 110 hours, even more preferably of at least 120 hours, most preferably of at least 125 hours.

By fibre is herein understood an elongated body, e.g. a body having a length and transverse dimensions, wherein the length of the body is much greater than its transverse dimensions. The term fibre as used herein may also include various embodiments, e.g. a filament, a tape, a strip, a ribbon and a yarn. The fiber may also have regular or irregular cross-sections. The fiber may also have a continuous and/or a discontinuous length. Preferably, the fiber has a continuous length, such fiber being known in the art as a filament. Within the context of the invention, a yarn is understood to be an elongated body comprising a plurality of fibres.

Preferably, the creep lifetime of the inventive UHMWPE fibers as described in the embodiments hereinabove, is at least 150 hours, more preferably at least 200 hours, even more preferably at least 250 hours, even more preferably at least 290 hours, yet even more preferably at least 350 hours, yet even more preferably at least 400 hours, most preferably at least 445 hours. Such good creep lifetimes were particularly obtained for the embodiments of fibers spun from UHMWPEs with ethyl and butyl branches. The creep lifetime is measured on multifilament yarns in accordance with the methodology described in the METHODS FOR MEASUREMENT section hereinbelow.

Preferably, the inventive UHMWPE fibers and in particular those spun from UHMWPEs having ethyl or butyl branches, undergo an elongation during their creep lifetime, under a load of 600 MPa and at a temperature of 70° C., of at most 20%, more preferably of at most 15%, even more preferably of at most 9%, yet even more preferably of at most 7%, yet even more preferably of at most 5%, most preferably of at most 3.7%. It was observed that UHMWPE fibers having such long creep lifetime and low elongation were never manufactured hitherto, in particular when these properties were subjected to high loads and high temperatures as those used in the present invention.

Preferably, the inventive UHMWPE fibers and in particular those spun from UHMWPEs having ethyl or butyl branches, have a tenacity of at least 25 cN/dtex, more preferably of at least 32 cN/dtex, most preferably of at least 38 cN/dtex. Preferably, the inventive UHMWPE fibers and in particular those spun from UHMWPEs having ethyl or butyl branches, have an elastic modulus of at least 1100 cN/dtex, more preferably of at least 1200 cN/dtex, most preferably of at least 1300 cN/dtex. It was observed that in addition to the excellent creep properties, the inventive UHMWPE fibers have also good tensile properties.

According to the invention, the inventive UHMWPE fibers are obtained by a spinning process, e.g. gel spinning or melt spinning. Preferably, the inventive UHMWPE fibers and in particular those spun from UHMWPEs having ethyl or butyl branches, are obtained by a gel-spinning process, in the art such fibers being also referred to as "gel-spun UHMWPE fibers". Therefore, the fibers of the invention are preferably obtained by gel-spinning an UHMWPE comprising ethyl branches or butyl branches and having a number of branches per thousand carbon atoms, an ES and an IV as described throughout the present document.

For the present invention, by gel-spinning process is meant a process comprising at least the steps of (a) preparing a solution comprising an UHMWPE and a suitable solvent for UHMWPE; (b) extruding said solution through a spinneret to obtain a gel fiber containing said UHMWPE and said solvent for UHMWPE; and (c) extracting the solvent from the gel fiber to obtain a solid fiber. The gel-spinning process may also optionally contain a drawing step wherein the gel fiber and/or the solid fiber are drawn with a certain draw ratio. Gel spinning processes are known in the art and are disclosed for example in WO 2005/066400; WO 2005/066401; WO 2009/043598; WO 2009/043597; WO 2008/131925; WO 2009/124762; EP 0205960 A, EP 0213208 A1, U.S. Pat. No. 4,413,110, GB 2042414 A, GB-A-2051667, EP 0200547 B1, EP 0472114 B1, WO 2001/73173 A1, EP 1,699,954 and in "*Advanced Fibre Spinning Technology*", Ed. T. Nakajima, Woodhead Publ. Ltd (1994), ISBN 185573 182 7, these publications and the references cited therein being included herein by reference.

According to the invention, the gel-spinning process for manufacturing the inventive UHMWPE fibers, uses an UHMWPE polymer. By UHMWPE is herein understood a polyethylene having an intrinsic viscosity (IV) as measured on solution in decalin at 135° C., of preferably at least 5 dl/g. Preferably, the IV of the UHMWPE is at least 10 dl/g, more preferably at least 15 dl/g, even more preferably at least 19 dl/g, most preferably at least 21 dl/g. Preferably, the IV is at most 40 dl/g, more preferably at most 30 dl/g, even more preferably at most 25 dl/g.

The UHMWPE used in the present invention has preferably a ratio $$\frac{OB/1000\ C}{ES}$$

of at least 0.3, more preferably of at least 0.4, even more preferably of at least 0.5, yet even more preferably of at least 0.7, yet even more preferably of at least 1.0, yet even more preferably of at least 1.2. It was surprisingly observed that by increasing the above mentioned ratio, the properties of the inventive UHMWPE fibers may be improved.

When the UHMWPE used in the present invention has ethyl branches, said UHMWPE preferably has a ratio $$\frac{C2H5/1000\ C}{ES}$$

of at least 1.00, more preferably of at least 1.30, even more preferably of at least 1.45, yet even more preferably of at least 1.50, most preferably of at least 2.00. Preferably said ratio is between 1.00 and 3.00, more preferably between 1.20 and 2.80, even more preferably between 1.40 and 1.60, yet even more preferably between 1.45 and 2.20.

When the UHMWPE used in the present invention has butyl branches, said UHMWPE preferably has a ratio $$\frac{C4H9/1000\ C}{ES}$$

of at least 0.25, even more preferably at least 0.30, yet even more preferably at least 0.40, yet even more preferably at least 0.70, more preferably of at least 1.00, most preferably of at least 1.20. Preferably said ratio is between 0.20 and 3.00, more preferably between 0.40 and 2.00, even more preferably between 1.40 and 1.80.

The UHMWPE used in the present invention has preferably an ES of at most 0.70, more preferably of at most 0.50, more preferably of at most 0.49, even more preferably at most 0.45, most preferably at most 0.40. When said UHMWPE has ethyl branches, preferably said UHMWPE has an ES of between 0.30 and 0.70, more preferably between 0.35 and 0.50. When said UHMWPE has butyl branches, preferably said UHMWPE has an ES of between 0.30 and 0.50, more preferably between 0.40 and 0.45.

The UHMWPE used according to the invention, also has preferably an amount of olefinic branches per thousand carbon atoms (OB/1000 C) of between 0.05 and 1.30, more preferably between 0.10 and 1.10, even more preferably between 0.30 and 1.05.

When the UHMWPE used according to the invention has ethyl branches, preferably said UHMWPE has an amount of ethyl branches per thousand carbon atoms (C2H5/1000 C) of between 0.40 and 1.10, more preferably between 0.60 and 1.10. In a first preferred embodiment, the C2H5/1000 C is between 0.63 and 0.75, preferably between 0.64 and 0.72, more preferably between 0.65 and 0.70. For the first preferred embodiment, it was observed that the tensile properties of the inventive UHMWPE fibers were improved while also achieving a unique creep lifetime. In a second preferred embodiment, the C2H5/1000 C is between 0.78 and 1.10, preferably between 0.90 and 1.08, more preferably between 1.02 and 1.07. For the second preferred embodiment it was observed that the creep lifetime of the inventive UHMWPE fibers was improved.

When the UHMWPE used according to the invention has butyl branches, preferably said UHMWPE has an amount of butyl branches per thousand carbon atoms (C4H9/1000 C) of between 0.05 and 0.80, more preferably between 0.10 and 0.60, even more preferably between 0.15 and 0.55, most preferably between 0.30 and 0.55.

In one preferred embodiment, the inventive UHMWPE fiber is obtained by gel-spinning an UHMWPE comprising ethyl branches and having an elongational stress (ES), wherein the ratio $$\left(\frac{C2H5/1000\ C}{ES}\right)$$

between the number of ethyl branches per thousand carbon atoms (C2H5/1000 C) and the elongational stress (ES) is at least 1.0, wherein C2H5/1000 C is between 0.60 and 0.80 and wherein the ES is between 0.30 and 0.50. Preferably, the UHMWPE has an IV of at least 15 dl/g, more preferably at least 20 dl/g, more preferably at least 25 dl/g. Preferably, the inventive fiber has a creep lifetime of at least 90 hours, preferably of at least 150 hours, more preferably of at least 200 hours, even more preferably of at least 250 hours, most preferably of at least 290 hours.

In a further preferred embodiment, the inventive UHMWPE fiber is obtained by gel-spinning an UHMWPE comprising ethyl branches and having an elongational stress (ES), wherein the ratio $$\left(\frac{C2H5/1000\ C}{ES}\right)$$

between the number of ethyl branches per thousand carbon atoms (C2H5/1000 C) and the elongational stress (ES) is at least 1.0, wherein C2H5/1000 C is between 0.90 and 1.10 and wherein the ES is between 0.30 and 0.50. Preferably, the UHMWPE has an IV of at least 15 dl/g, more preferably at least 19 dl/g. Preferably, the inventive fiber has a creep lifetime of at least 90 hours, preferably of at least 150 hours, more preferably of at least 250 hours, most preferably of at least 350 hours.

In a further preferred embodiment, the inventive UHMWPE fiber is obtained by gel-spinning an UHMWPE comprising butyl branches and having an elongational stress (ES), wherein the ratio $$\left(\frac{C4H9/1000\ C}{ES}\right)$$

between the number of butyl branches per thousand carbon atoms (C4H9/1000 C) and the elongational stress (ES) is at least 0.5, wherein C4H9/1000 C is between 0.20 and 0.80 and wherein the ES is between 0.30 and 0.50. Preferably, the UHMWPE has an IV of at least 15 dl/g, more preferably at least 20 dl/g. Preferably, the inventive fiber has a creep lifetime of at least 90 hours, more preferably of at least 200 hours, even more preferably of at least 300 hours, yet even more preferably of at least 400 hours, most preferably of at least 500 hours.

Preferably, any ones of the UHMWPEs used according to the invention are obtained by a slurry polymerisation process in the presence of an olefin polymerisation catalyst at a polymerisation temperature, said process comprising in the following sequence the steps of:
a) charging a stainless steel reactor with
  i. a non-polar aliphatic solvent with a boiling point at standard conditions of above that of the polymerization temperature, wherein said polymerisation temperature is preferably between 50° C. and 90° C., more preferably between 55° C. and 80° C., most preferably between 60° C. and 70° C.; wherein said boiling point of said solvent is between 60° C. and 100° C.; wherein said solvent is preferably chosen from the group consisting of heptane, hexane, pentamethylheptane and cyclohexane;
  ii. an aluminium alkyl as co-catalyst such as triethylaluminium (TEA) or triisobutylaluminium (TIBA);
  iii. ethylene gas to a pressure between 0.1 and 5 barg, preferably between 1 and 3 barg, most preferably between 1.8 and 2.2 barg;
  iv. an alpha-olefinic comonomer;
  v. a Ziegler-Natta catalyst suitable of producing UHMWPE under the conditions a)-i) to a)-iv);
b) gradually increasing the ethylene gas pressure inside the reactor, e.g. by adjusting the ethylene gas flow, to reach an ethylene gas pressure of at most 10 barg during the course of the polymerization process; and
c) allowing for the polymerisation of UHMWPE molecules to produce UHMWPE particles having an average particle size (D50) as measured by ISO 13320-1 of between 80 μm and 300 μm, more preferably of between 100 μm and 200 μm, most preferably of between 140 μm and 160 μm.

The alpha-olefinic comonomer is chosen with due regard to the type of branching required.

In one embodiment, in order to produce an UHMWPE having ethyl branches, the alpha-olefinic comonomer is butene gas, more preferably 1-butene gas, in a ratio of gas:total ethylene (NL:NL) of at most 325:1, preferably at most 150:1, most preferably at most 80:1; wherein by total ethylene is understood the ethylene added in steps a)-iii) and b).

In another embodiment, in order to produce an UHMWPE having butyl, e.g. n-butyl, or hexyl branches, the olefinic comonomer is 1-hexene or 1-octene, respectively. Preferably, by butyl branches are herein understood n-butyl branches.

It was observed that with the above polymerisation process an UHMWPE was obtained which enabled the manufacturing of inventive UHMWPE fibers having unique creep properties. The invention therefore also relates to the above polymerisation process for making an UHMWPE as used in the present invention and to an UHMWPE obtainable with said process.

The invention further relates to an UHMWPE comprising olefinic branches and having an elongational stress (ES), and a ratio $$\left(\frac{OB/1000\ C}{ES}\right)$$

between the number of olefinic branches per thousand carbon atoms (OB/1000 C) and the elongational stress (ES) of at least 0.2. Preferably, the IV of the UHMWPE is at least 5 dl/g. Preferably, the olefinic branches have a number of carbon atoms between 1 and 15, more preferably between 2 and 10, most preferably between 2 and 6. Good results were obtained when the branches were ethyl branches (C=2) or butyl branches (C=4). The invention also relates to the various embodiments of the UHWMPE as presented throughout this disclosure.

It could be desirable that at step a) of the process for making UHMWPE in accordance with the invention, hereinafter simply referred to as "the inventive UHMWPE making process", a donor compound is also added to the solvent. Preferably, the donor compound can be classified as an organic molecule possessing Lewis basicity that can react or modify the catalyst/co-catalyst in such a way to increase the molecular weight capability. A donor which can be used is for example an alkoxy silane compound. Most preferably, said silane compound is an alkoxy silane compound having substituents ranging from methoxy groups (OCH3) to isopropoxy groups (OCH(CH3)2). Most preferred substituents are ethoxy groups (OCH2CH3). One suitable example of such a silane compound is tetraethyl orthosilicate (TEOS). The amount of the silane compound is preferably between 0.01 and 0.2 mmol/(liter of solvent), more preferably between 0.03 and 0.1 mmol/(liter of solvent), most preferably between 0.05 and 0.07 mmol/(liter of solvent).

Preferably, the olefin polymerisation catalyst used in the inventive UHMWPE making process is a Titanium based Ziegler-Natta catalyst for producing UHMWPE. Examples of suitable catalysts are described in WO 2008/058749 or EP 1 749 574 included herein by reference, Preferably, said catalyst component is in the form of particles having an average diameter smaller than 20 micrometers, more preferably smaller than 10 micrometers, most preferably, the particle size is between 2 and 8 micrometers. Preferably, the particle size distribution characteristic to said catalyst and measure with a Malvern Mastersizer Equipment is at most 1.5, more preferably at most 1.3, most preferably at most 1. Most preferably said particle size distribution is between 0.5 and 0.9.

It was observed that by using the UHMWPE obtained by the inventive UHMWPE making process, inventive UHMWPE fibers having unmatched creep lifetime may be obtained. Although not being able to explain the reasons for the unique creep lifetime improvement, the inventors partly attributed said improvement to the particular process used to obtain said UHMWPE.

According to the invention, a gel-spinning process is used to manufacture the inventive UHMWPE fibers, wherein as already mentioned hereinabove, the UHMWPE is used to produce an UHMWPE solution, which is subsequently spun through a spinneret and the obtained gel fiber is dried to form a solid fiber.

The UHMWPE solution is preferably prepared with a UHMWPE concentration of at least 3 mass-%, more preferably of at least 5 mass-%. Preferably, the concentration is between 3 and 15 mass-% for UHMWPE with IV in the range 15-25 dl/g.

To prepare the UHMWPE solution, any of the known solvents suitable for gel spinning the UHMWPE may be used. Such solvents are also referred to herein as "spinning solvents". Suitable examples of solvents include aliphatic and alicyclic hydrocarbons, e.g. octane, nonane, decane and paraffins, including isomers thereof; petroleum fractions; mineral oil; kerosene; aromatic hydrocarbons, e.g. toluene, xylene, and naphthalene, including hydrogenated derivatives thereof, e.g. decalin and tetralin; halogenated hydrocarbons, e.g. monochlorobenzene; and cycloalkanes or cycloalkenes, e.g. careen, fluorine, camphene, menthane, dipentene, naphthalene, acenaphtalene, methylcyclopentandien, tricyclodecane, 1,2,4,5-tetramethyl-1,4-cyclohexadiene, fluorenone, naphtindane, tetramethyl-p-benzodiquinone, ethylfuorene, fluoranthene and naphthenone. Also combinations of the above-enumerated solvents may be used for gel spinning of UHMWPE, the combination of solvents being also referred to for simplicity as solvent. In a preferred embodiment, the solvent of choice is not volatile at room temperature, e.g. paraffin oil. It was also found that the process of the invention is especially advantageous for relatively volatile solvents at room temperature, as for example decalin, tetralin and kerosene grades. In the most preferred embodiment the solvent of choice is decalin.

The UHMWPE solution is then formed into gel filaments by spinning said solution through a spinneret preferably containing multiple spinholes. By spinneret containing multiple spinholes is herein understood a spinneret containing preferably at least 100, yet even more preferably at least 300, most preferably at least 500 spinholes. Preferably, the spinning temperature is between 150° C. and 250° C., more preferably said temperature is chosen below the boiling point of the spinning solvent. If for example decaline is used as spinning solvent the spinning temperature is preferably at most 190° C.

The gel filaments formed by spinning the UHMWPE solution through the spinneret are extruded into an air gap, and then into a cooling zone from where they are picked-up on a first driven roller. Preferably, the gel filaments are stretched in the air gap. In the cooling zone, the gel filaments are cooled preferably in a gas flow and/or in a liquid bath.

Subsequently to forming the gel filaments, said gel filaments are subjected to a solvent extraction step wherein the spinning solvent used to manufacture the UHMWPE solution is at least partly removed from the gel filaments to form solid filaments. The solvent removal process may be performed by known methods, for example by evaporation when a relatively volatile spinning solvent, e.g. decaline, is used or by using an extraction liquid, e.g. when paraffin is used as spinning solvent, or by a combination of both methods. Preferably the gel filaments are drawn with a draw ratio of preferably at least 1.2, more preferably at least 1.5, most preferable at least 2.0.

Preferably, the solid filaments are also drawn during and/or after said removal of the solvent. Preferably, the drawing of the solid filaments is performed in at least one drawing step with a draw ratio of preferably at least 4, more preferably at least 7, even more preferably at least 10. More preferably, the drawing of solid filaments is performed in at least two steps, even more preferably in at least three steps.

Preferably, a gel-spinning process in accordance with WO 2005/066400; WO 2005/066401; WO 2009/043598; WO 2009/043597; WO 2008/131925; WO 2009/124762; is used to manufacture the inventive UHMWPE fibers.

The inventive UHMWPE fibres have properties which make them an interesting material for use in ropes, cordages and the like, preferably ropes designed for heavy-duty operations as for example marine, industrial and offshore operations. Rigging ropes and ropes used in sports applications such as yachting, climbing, kiteflying, parachuting and the like are also applications where the fibers of the invention may perform well. In particular it was observed that the inventive UHMWPE fibers are particularly useful for long-term and ultralong-term heavy-duty operations.

Heavy duty operations may further include, but not restricted to, crane ropes, ropes for deep-sea deployment or recovery of hardware, anchor handling, mooring of support platforms for offshore renewable energy generation, mooring of offshore oil drilling rigs and production platforms such as offshore production platforms and the like. It was surprisingly observed that for such operations, and in particular for offshore mooring, the installation of ropes designed therefor may be optimized, e.g. the ropes can be installed using less complex hardware or smaller and lighter installation equipment.

The inventive UHMWPE fibers are also very suitable for use as a reinforcing element, for example in a liner, for reinforced products such as hoses, pipes, pressurized vessels, electrical and optical cables, especially when said reinforced products are used in deepwater environments where reinforcement is required to support the load of the reinforced products when free hanging. The invention therefore also relates to a liner and a reinforced product containing reinforcing elements or containing said liner, wherein the reinforcing elements or the liner contain the inventive UHMWPE fibers.

Most preferably, the inventive UHMWPE fibres are used in applications where said fibres experience static tension or static loads and in particular long-term and ultralong-term static tension or static loads. By static tension is herein meant that the fibre in application always or most of the time is under tension irrespective if the tension is at constant level (for example a weight hanging freely in a rope comprising the fibre) or varying level (for example if exposed to thermal expansion or water wave motion). Examples of applications wherein static tensions are encountered are for example many medical applications (for example cables and sutures) but also mooring ropes, and tension reinforcement elements, as the improved creep lifetime of the present fibres leads to improved performances of these and similar applications. A particular application of the inventive UHMWPE fibers is in crane ropes where the rope can reach an elevated temperature as result of (1) ambient temperatures and/or (2) internal heat generation due to friction around crane sheaves.

Therefore, the invention relates to ropes and in particular mooring ropes, with or without a cover, containing the inventive UHMWPE fibres. Preferably, at least 50 mass-%, more preferably at least 75 mass-%, even more preferably at least 90 mass-% from the total mass of the fibres used to manufacture the rope and/or the cover consists of the inventive UHMWPE fibres. Most preferably the mass of fibers used to manufacture the rope and/or the cover consists of the inventive UHMWPE fibres. The remaining mass percentage of the fibres in the rope according to the invention, may contain fibres or combination of fibers made of other materials suitable for making fibres as for example metal, glass, carbon, nylon, polyester, aramid, other types of polyolefin and the like.

The invention further relates to composite articles containing the inventive UHMWPE fibres.

In a preferred embodiment, the composite article contains at least one mono-layer comprising the UHMWPE fibres of the invention. The term mono-layer refers to a layer of fibers, i.e. fibers in one plane. In a further preferred embodiment, the mono-layer is a unidirectional mono-layer. The term unidirectional mono-layer refers to a layer of unidirectionally oriented fibers, i.e. fibers in one plane that are essentially oriented in parallel. In a yet further preferred embodiment, the composite article is multi-layered composite article, containing a plurality of unidirectional mono-layers the direction of the fibres in each mono-layer preferably being rotated with a certain angle with respect to the direction of the fibres in an adjacent mono-layer. Preferably, the angle is at least 30°, more preferably at least 45°, even more preferably at least 75°, most preferably the angle is about 90°. Multi-layered composite articles proved very useful in ballistic applications, e.g. body armor, helmets, hard and flexible shield panels, panels for vehicle armouring and the like. Therefore, the invention also relates to ballistic-resistant articles as the ones enumerated hereinabove containing the UHMWPE fibres of the invention.

The inventive UHMWPE fibres of the invention are also suitable for use in medical devices, e.g. sutures, medical cables, implants, surgical repair products and the like. The invention therefore further relates to a medical device, in particular to a surgical repair product and more in particular to a suture and to a medical cable comprising the UHMWPE fibres of the invention.

It was also observed that the inventive UHMWPE fibres are also suitable for use in other applications like for example, synthetic chains, conveyor belts, tensiarity structures, concrete reinforcements, fishing lines and fishing nets, ground nets, cargo nets and curtains, kite lines, dental floss, tennis racquet strings, canvas (e.g. tent canvas), nonwoven cloths and other types of fabrics, webbings, battery separators, capacitors, pressure vessels (e.g. pressure cylinders, inflatables), hoses, (offshore) umbilical cables, electrical, optical fiber, and signal cables, automotive equipment, power transmission belts, building construction materials, cut and stab resistant and incision resistant articles, protective gloves, composite sports equipment such as skis, helmets, kayaks, canoes, bicycles and boat hulls and spars, speaker cones, high performance electrical insulation, radomes, sails, geo-textiles such as mats, bags and nets; and the like. Therefore, the invention also relates to the applications enumerated above containing the UHMWPE fibers of the invention.

The invention also relates to an elongated object comprising a plurality of the UHMWPE fibers of the invention, wherein said fibers are at least partly fused to each other. In one embodiment said elongated object is a monofilament. In a different embodiment, said elongated object is a tape. By at least partly fused fibers is herein understood that individual fibers are fused at multiple locations along their length and disconnected between said locations. Preferably, said fibers are fully fused to each other, i.e. the individual fibers are fused to each other over essentially their whole length. Preferably, the fusing is carried out by at least compressing said plurality of UHMWPE fibers under a temperature lower than the melting temperature of the fibers. The melting temperature of the fibers can be determined by DSC using a methodology as described at pg. 13 of WO 2009/056286. Processes of fusing UHMWPE fibers into monofilaments and tapes are known in the art and disclosed for example in WO 2004/033774; WO 2006/040190; and WO 2009/056286. It was observed that by using the fibers of the invention, monofilaments and tapes having optimized creep properties were achieved. Such products were suitable for utilisation in applications such as fishing lines; liners; reinforcing elements; antiballistic articles such as armours; car parts; and architectural applications such as doors.

The invention will be further explained by the following examples and comparative experiment, however first the methods used in determining the various parameters used hereinabove are presented.

METHODS OF MEASUREMENT

IV: the Intrinsic Viscosity for UHMWPE is determined according to ASTM D1601-99(2004) at 135° C. in decalin, with a dissolution time of 16 hours, with BHT (Butylated Hydroxy Toluene) as anti-oxidant in an amount of 2 g/l solution. IV is obtained by extrapolating the viscosity as measured at different concentrations to zero concentration.

dtex: fibers' titer (dtex) was measured by weighing 100 meters of fiber. The dtex of the fiber was calculated by dividing the weight in milligrams to 10;

Tensile properties of fibers: tensile strength (or strength) and tensile modulus (or modulus) and elongation at break are defined and determined on multifilament yarns as specified in ASTM D885M, using a nominal gauge length of the fibre of 500 mm, a crosshead speed of 50%/min and Instron 2714 clamps, of type "Fibre Grip D5618C". On the basis of the measured stress-strain curve the modulus is determined as the gradient between 0.3 and 1% strain. For calculation of the modulus and strength, the tensile forces measured are divided by the titre, as determined by weighing 10 meters of fibre; values in GPa are calculated assuming a density of 0.97 g/cm$^3$.

Tensile properties of fibers having a tape-like shape: tensile strength, tensile modulus and elongation at break are defined and determined at 25° C. on tapes of a width of 2 mm as specified in ASTM D882, using a nominal gauge length of the tape of 440 mm, a crosshead speed of 50 mm/min.

Number of olefinic, e.g. ethyl or butyl, branches per thousand carbon atoms: was determined by FTIR on a 2 mm thick compression moulded film by quantifying the absorption at 1375 cm$^{-1}$ using a calibration curve based on NMR measurements as in e.g. EP 0 269 151 (in particular pg. 4 thereof).

Elongational stress (ES in N/mm$^2$) of an UHMWPE, is measured according to ISO 11542-2A.

Figure 1:
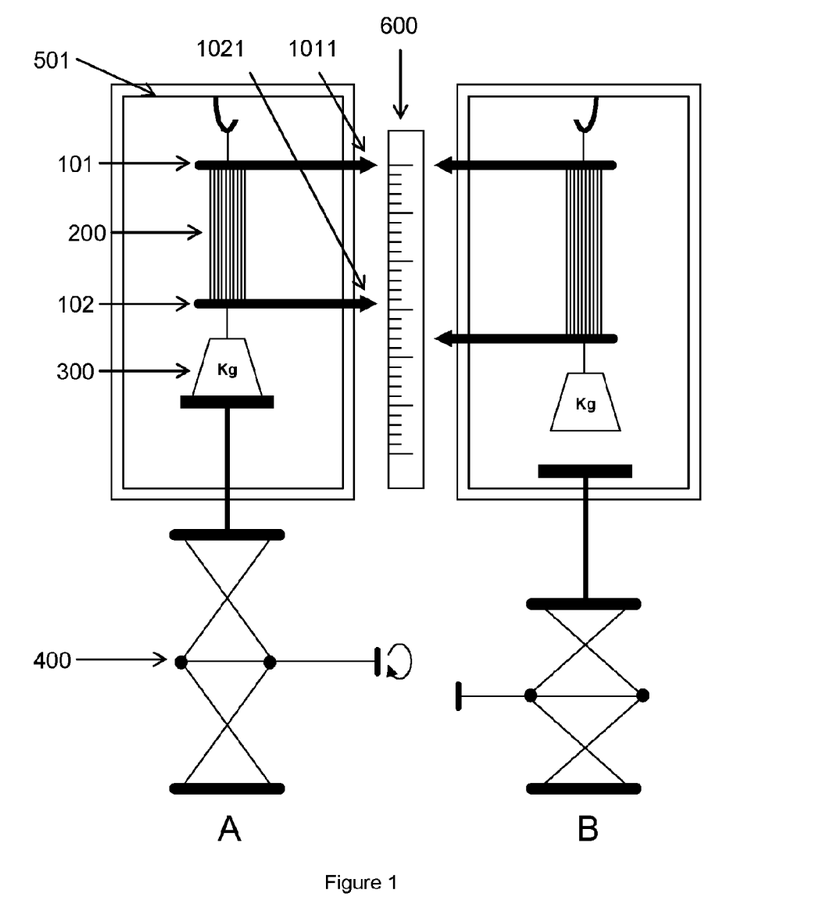
FIG. 1 shows a setup used for the determination of the creep lifetime of the UHMWPE fibers of the invention.

Creep lifetime and elongation during the creep lifetime were determined in accordance with the methodology described in the paper "*Predicting the Creep Lifetime of HMPE Mooring Rope Applications*" by M. P. Vlasblom and R. L. M. Bosman—Proceedings of the MTS/IEEE OCEANS 2006 Boston Conference and Exhibition, held in Boston, Mass. on Sep. 15-21, 2006, Session Ropes and tension Members (Wed 1:15 P.M.-3:00 P.M.). More in particular the creep lifetime may be determined with a device as schematically represented in FIG. 1, on untwined yarn samples, i.e. yarn with substantially parallel filaments, of about 1500 mm length, having a titer of about 504 dtex and consisting of 900 filaments. In case fibers having a tape-like shape need to be investigated, fibers having a width of about 2 mm were used. The yarn samples were slip-free clamped between two clamps (101) and (102) by winding each of the yarn's ends several times around the axes of the clamps and then knotting the free ends of the yarn to the yarn's body. The final length of the yarn between the clamps (200) was about 180 mm. The clamped yarn sample was placed in a temperature-controlled chamber (500) at a temperature of 70° C. by attaching one of the clamps to the ceiling of the chamber (501) and the other clamp to a counterweight (300) of 3187 g resulting in a load of 600 MPa on the yarn. The position of the clamp (101) and that of clamp (102) can be read on the scale (600) marked off in centimeters and with subdivisions in mm with the help of the indicators (1011) and (1021). Special care was taken when placing the yarn inside said chamber to ensure that the segment of the yarn between the clamps does not touch any components of the device, so that the experiment can run fully friction free. An elevator (400) underneath the counterweight was used to raise the counterweight to an initial position whereat no slackening of the yarn occurs and no initial load is applied to the yarn. The initial position of the counterweight is the position wherein the length of the yarn (200) equals the distance between (101) and (102) as measured on (600). The yarn was subsequently preloaded with the full load of 600 MPa during 10 seconds by lowering the elevator, after which the load was removed by raising again the elevator to the initial position. The yarn was subsequently allowed to relax for a period of 10 times the preloading time, i.e. 100 seconds. After the preloading sequence, the full load was applied again. The elongation of the yarn in time was followed on the scale (600) by reading the position of the indicator (1021). The time needed for said indicator to advance 1 mm was recorded for each elongation of 1 mm until the yarn broke.

The elongation of the yarn $\epsilon_i$ [in mm] at a certain time t is herein understood the difference between the length of the yarn between the clamps at that time t, i.e. L(t), and the initial length (200) of the yarn $L_0$ between the clamps. Therefore:

$$\epsilon_i(t)[\text{in mm}] = L(t) - L_0$$

The elongation of the yarn [in percentages] is:

$$\varepsilon_i(t)[\text{in \%}] = \frac{L(t) - L_0}{L_0} \times 100$$

Figure 2:
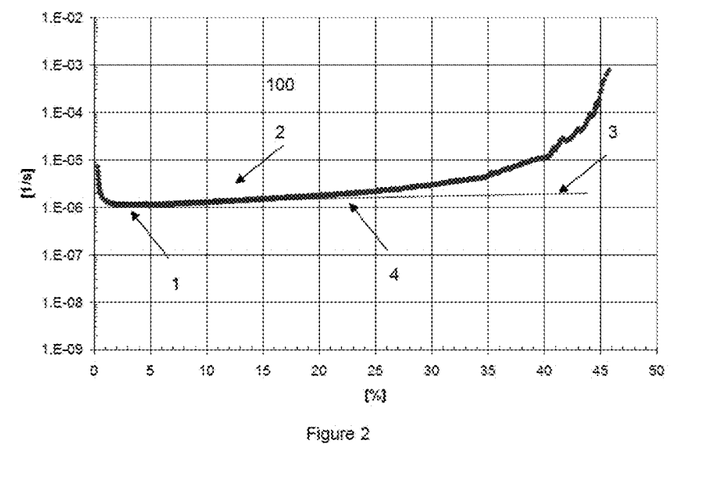
FIG. 2 shows a plot of the creep rate [1/s] on a logarithmic scale vs. the elongation in percentage [%] characteristic to an investigated yarn.

The creep rate [in 1/s] is defined as the change in yarn's length per time step and was determined according to Formula (2) as:

$$\dot{\varepsilon}_i = \frac{\varepsilon_i - \varepsilon_{i-1}}{t_i - t_{i-1}} \times \frac{1}{100} \quad (2)$$

wherein $\epsilon_i$ and $\epsilon_{i-1}$ are the elongations [in %] at moment i and at the previous moment i−1; and $t_i$ and $t_{i-1}$ are the time (in seconds) needed for the yarn to reach the elongations $\epsilon_i$ and $\epsilon_{i-1}$, respectively. The creep rate [1/s] was then plotted on a logarithmic scale vs. the elongation in percentage [%] to yield a plot (100) as for example shown in FIG. 2. The minimum (1) of the plot in FIG. 2 was then determined and the linear portion (2) thereof after said minimum (1) was fitted with a straight line (3) which contained also the minimum (1) of the plot. The elongation (4) where the plot (100) begins to deviate from the straight line was used to determine the time at which that elongation occurred. This time was considered as the creep lifetime for the yarn under investigation. Said elongation (4) was considered as the elongation during the creep lifetime.

PREPARATION OF UHMWPE

Grade a)

A batch polymerization process was performed in a 55 L stainless steel reactor equipped with a mechanical stirrer. The reactor was charged with 25 liter of dry heptane and then heated to 60° C. The temperature has been controlled by a thermostat. Subsequently, the reactor has been charged with 96.25 NL of 1-butene; 3.30 ml (0.5 mol/L) TEOS; and 12.65 ml (2 mol/L) TEA.

The reactor has been subsequently pressurized with ethylene gas to 2 bar using an ethylene flow of about 1800 NL/h. Once the 2 bar pressure has been reached, an amount of 10.36 ml (65 mg/ml) of Ziegler-Natta catalyst has been added to the reactor. The reactor has been subsequently pressurized with ethylene to 5 bar using a flow of 1800 NL/h and kept at this pressure for 15 minutes. Subsequently, ethylene was added to the reactor with a maximum flow of 1800 NL/h until the desired total amount of ethylene had been dosed (7700 NL)

After the desired polymerization time has been reached (7700 NL counts of ethylene consumption) the polymerization has been stopped by closing the ethylene supply and the reaction mixture was removed from the reaction vessel and collected in the filter where the polymer was dried over night by a $N_2$ flow of 1 bar. The polyethylene produced according to the above described process had an ES of 0.48, 0.69 ethyl branches per 1000 carbon atoms and an IV of about 25 dl/g.

Grade b)

The polymerization process described immediately above in relation to Grade a) has been repeated, however, only 1.65 ml (0.5 mol/L) of TEOS was used. The polyethylene produced according to this process had an ES of 0.39, 1.05 ethyl branches per 1000 carbon atoms and an IV of about 19 dl/g.

Grade c)

A batch polymerization process was performed in a 55 L stainless steel reactor equipped with a mechanical stirrer. The reactor was charged with 25 liter of dry heptane and 550 ml of dry 1-hexene and then heated to 65° C. The temperature has been controlled by a thermostat. Subsequently, the reactor has been charged with 6.0 ml (0.4 mol/L) TEOS; and 12.15 ml (2 mol/L) TEA.

The reactor has been subsequently pressurized with ethylene gas to 2 bar using an ethylene flow of about 2300 NL/h. Once the 2 bar pressure has been reached, an amount of 12.4 ml (68.18 mg/ml) of Ziegler-Natta catalyst has been added to the reactor. The reactor has been subsequently pressurized with ethylene to 4 bar using a flow of 2300 NL/h and kept at this pressure for about 15 minutes. Subsequently, the polymerization has been carried out under an ethylene flow of about 2300 N L/h.

After the desired polymerization time has been reached (7700 NL counts of ethylene consumption) the polymerization has been stopped by closing the ethylene supply and the reaction mixture was removed from the reaction vessel and collected in the filter where the polymer was dried over night by a $N_2$ flow of 1 bar. The polyethylene produced according to the above described process had an ES of 0.42, 0.31 n-butyl branches per 1000 carbon atoms and an IV of about 21 dl/g.

Grade d)

The polymerization process described immediately above in relation to Grade c) has been repeated, however, 1400 ml of dry 1-hexene were added and 3 ml (0.4 mol/L) of TEOS were used. The polyethylene produced according to this process had an ES of 0.41, 0.53 n-butyl branches per 1000 carbon atoms and an IV of about 21 dl/g.

COMPARATIVE EXPERIMENT

A 5 mass-% solution of a UHMWPE (sold by Ticona as GUR 4170) in decalin was made, said UHMWPE having an IV of 21 dl/g as measured on solutions in decalin at 135° C. Said UHMWPE seemed not to contain any ethyl or butyl branches as measurable with the method for measuring branches used in accordance with the invention.

A process such as the one disclosed in WO 2005/066401 was used to produce UHMWPE fibers. In particular, the UHMWPE solution was extruded with a 25 mm twin screw extruder equipped with a gear-pump at a temperature setting of 180° C. through a spinneret having a number n of 390 spinholes into an air atmosphere containing also decalin and water vapors with a rate of about 1.5 g/min per hole.

The spinholes had a circular cross-section and consisted of a gradual decrease in the initial diameter from 3.5 mm to 1 mm with a cone angle of 60° followed by a section of constant diameter with L/D of 10, this specific geometry of the spinholes introducing a draw ratio in the spinneret $DR_{sp}$ of 12.25.

From the spinneret the fluid fibres entered an air gap of 25 mm and into a water bath, where the fluid fibres were taken-up at such rate that a total draw ratio of the fluid UHMWPE filaments $DR_{fluid}$ of 277 was achieved.

The fluid fibres were cooled in the water bath to form gel fibres, the water bath being kept at about 40° C. and wherein a water flow was being provided with a flow rate of about 50 liters/hour perpendicular to the fibres entering the bath. From the water bath, the gel fibres were taken-up into an oven at a temperature of 90° C. wherein solvent evaporation occurred to form solid fibres.

The solid fibres were drawn in a first step at around 130° C. and in a second step at around 145° C. by applying a total solid draw ratio ($DR_{solid}$) of about 26.8, during which process most of the decalin evaporated. The total solid draw ratio is the product of the solid draw ratios used in the first and second drawing step.

The total stretch ratio $DR_{overall}$ (=$DR_{fluid} \times DR_{gel} \times DR_{solid}$) amounted 277×1×26.8=7424.

EXAMPLE 1

The Comparative Experiment was repeated with the UHMWPE prepared as exemplified above at Grade a). A 7.74 mass-% solution was used and spun through a spinneret having 64 holes with a rate of 1.43 g/min/hole. The spinholes had a gradual decrease in the initial diameter from 3.0 mm to 1.0 mm, introducing a $DR_{sp}$ of 9. The air gap was 15 mm and $DR_{fluid}$ was 141. The water bath was kept at about 30° C. and the water flow was about 50 liters/hour. The gel fibers were dried at about 95° C. and the solid fibers were stretched in a four steps process to reach a $DR_{solid}$ of about 18. The $DR_{overall}$ was 2468.

EXAMPLE 2

Example 1 was repeated with the UHMWPE prepared as exemplified above at Grade b). $DR_{solid}$ however was about 17 and the $DR_{overall}$ was 2397.

EXAMPLE 3

Example 1 was repeated using the UHMWPE prepared as exemplified above at Grade c) and using a 6.73 mass-% solution. $DR_{solid}$ was about 15 and the $DR_{overall}$ was 2115.

EXAMPLE 4

Example 3 was repeated with the UHMWPE prepared as exemplified above at Grade d). $DR_{solid}$ however was about 10 and the $DR_{overall}$ was 1410.

The fibres' properties of the Comparative Example and of the Examples, i.e. creep lifetime, tensile strength, and modulus together with the properties of some commercially available fibers, i.e. SK75 and SK78 from DSM Dyneema and Spectra 1000 and Spectra 2000 from Honeywell, US are summarized in Table 1. From said table it can be seen that the fibers of the invention have an unmatched creep lifetime. Moreover, the elongations to break (in %) of the fibers of the Examples 1-4 were 3.7; 3.3; 3.5 and 3.8, respectively; and thus lower than those of the samples used for comparison, which were higher than about 5%.

TABLE 1

|  | n | $DR_{sp}$ | $DR_{ag}$ | $DR_{fluid}$ | $DR_{solid}$ | $DR_{overall}$ | TS (GPa) | Modulus (GPa) | Creep lifetime (h) |
|---|---|---|---|---|---|---|---|---|---|
| SK75 | — | — | — | — | — | — | 3.4 | 110 | 10 |
| SK78 | — | — | — | — | — | — | 3.4 | 111 | 18 |
| Spectra 1000 | — | — | — | — | — | — | 3.0 | 76 | 3 |
| Spectra 2000 | — | — | — | — | — | — | 3.3 | 116 | 6 |
| Comp. Ex. | 390 | 12.25 | 22.6 | 277 | 26.8 | 7424 | 4.1 | 160 | 122 |
| Ex 1 | 64 | 9 | 15.7 | 141 | 17.5 | 2468 | 4.1 | 125 | 293 |
| Ex 2 | 64 | 9 | 15.7 | 141 | 17 | 2397 | 3.5 | 123 | 357 |
| Ex 3 | 64 | 9 | 15.7 | 141 | 15 | 2115 | 3.7 | 122 | >350 |
| Ex 4 | 64 | 9 | 15.7 | 141 | 10 | 1410 | 3.1 | 89 | >500 |

The invention claimed is:

1. A creep-optimized ultrahigh molecular weight polyethylene (UHMWPE) fiber obtained by spinning an UHMWPE having an intrinsic viscosity (IV) of at least 19 dl/g comprising ethyl branches or butyl branches and having an elongational stress (ES), wherein if the fiber is obtained by spinning an UHMWPE comprising ethyl branches, the ratio $$\left( \frac{C2H5/1000\ C}{ES} \right)$$

between the number of ethyl branches per thousand carbon atoms (C2H5/1000 C) and the elongational stress (ES) is between 1.0 and 3.00 mm²/N, wherein said UHMWPE fiber when subjected to a load of 600 MPa at a temperature of 70° C., has a creep lifetime of at least 125 hours, or wherein if the fiber is obtained by spinning an UHMWPE comprising butyl branches the ratio $$\left(\frac{C4H9/1000\ C}{ES}\right)$$

between the number of butyl branches per thousand carbon atoms (C4H9/1000 C) and the elongational stress (ES) is between 0.2 and 3.0 mm²/N, wherein said UHMWPE fiber when subjected to a load of 600 MPa at a temperature of 70° C., has a creep lifetime of at least 90 hours.

2. The fiber according to claim 1, wherein the creep lifetime is at least 290 hours.

3. The fiber according to claim 1, wherein the creep lifetime is at least 350 hours.

4. The fiber according to claim 1, wherein the UHMWPE has an ES of at most 0.50 N/mm².

5. The fiber according to claim 1 wherein the UHMWPE has a ratio $$\left(\frac{C2H5/1000\ C}{ES}\right)$$

between the amount of ethyl branches per thousand carbon atoms (C2H5/1000 C) and the elongation stress (ES) of between 1.20 and 2.80 mm²/N.

6. The fiber according to claim 1, wherein the UHMWPE is obtained by a slurry polymerisation process in the presence of an olefin polymerisation catalyst.

7. A rope, a crane rope, a mooring rope or a cordage comprising the fiber according to claim 1.

8. A reinforced product containing reinforcing elements, wherein the reinforcing elements contain the fiber according to claim 1.

9. A product comprising the fiber according to claim 1, wherein the product is selected from the group consisting of fishing lines, fishing nets, ground nets, cargo nets, cargo curtains, kite lines, dental floss, tennis racquet strings, canvas, woven cloths, nonwoven cloths, webbings, battery separators, capacitors, pressure vessels, hoses, umbilical cables, automotive equipment, power transmission belts, building construction materials, cut and stab resistant articles, incision resistant articles, protective gloves, composite sports equipment, skis, helmets, kayaks, canoes, bicycles and boat hulls and spars, speaker cones, high performance electrical insulation, radomes, sails, and geotextiles.

10. The fiber according to claim 1, obtained by a gel-spinning process.

11. The fiber according to claim 10, wherein the polymerization process comprises the following sequence of steps:
(a) charging a stainless steel reactor with
    (i) a non-polar aliphatic solvent with a boiling point at standard conditions of above that of the polymerization temperature, wherein said polymerisation temperature is preferably between 50° C. and 90° C.; wherein said boiling point of said solvent is between 60° C. and 100° C.;
    (ii) an aluminium alkyl as co-catalyst;
    (iii) ethylene gas to a pressure between 0.1 and 5 barg;
    (iv) 1-butene gas, in a ratio of gas:total ethylene (NL:NL) of at most 325:1, preferably at most 150:1, most preferably at most 80:1;
        wherein by total ethylene is understood the ethylene added in steps a)-iii) and b) or 1-hexene; and
    (v) a Ziegler-Natta catalyst suitable of producing UHMWPE under the conditions a)-i) to a)-iv);
(b) gradually increasing the ethylene gas pressure inside the reactor, to reach an ethylene gas pressure of at most 10 barg during the course of the polymerization process; and
(c) allowing for the polymerisation of UHMWPE molecules to produce
UHMWPE particles having an average particle size (D50) as measured by ISO 13320-1 of between 80 μm and 300 μm.

12. A multi-layered composite article for ballistic applications, wherein the composite article comprises the fiber according to claim 1.

13. The multi-layered composite article according to claim 12, wherein the ballistic applications include at least one selected from the group consisting of body armor, helmets, hard shield panels, flexible shield panels and vehicle armouring panels.

* * * * *